E. C. GRAVES.
VEHICLE WHEEL.
APPLICATION FILED AUG. 5, 1912.
1,068,582.
Patented July 29, 1913.
2 SHEETS—SHEET 1.
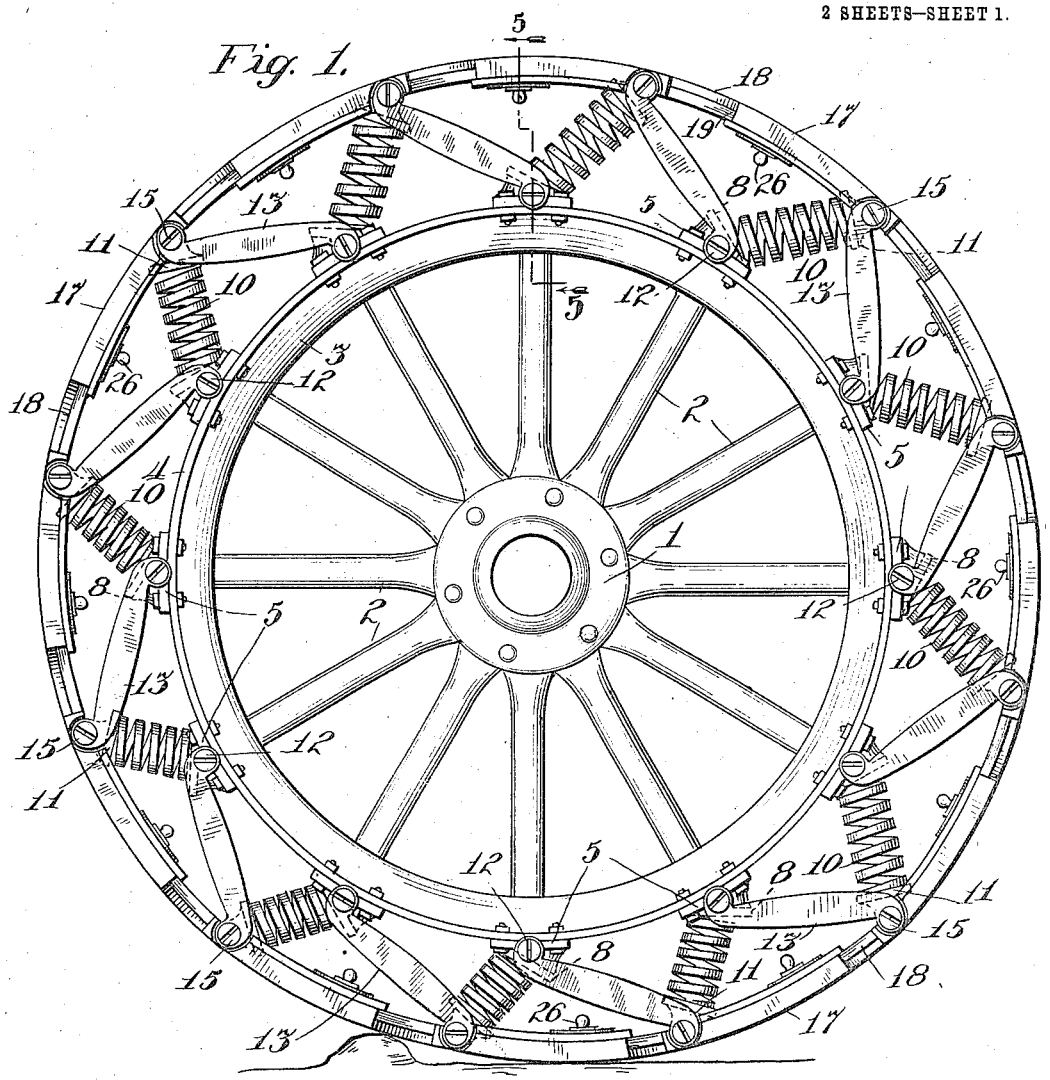
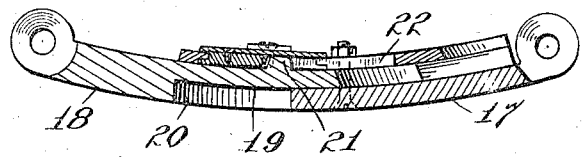
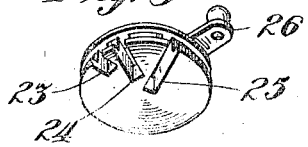
Witnesses:
Milton Lenoir
F. A. Florell
Inventor:
Emery C. Graves.
By Wallace R. Lane
Attorney.

E. C. GRAVES.
VEHICLE WHEEL.
APPLICATION FILED AUG. 5, 1912.
1,068,582.
Patented July 29, 1913.
2 SHEETS—SHEET 2.
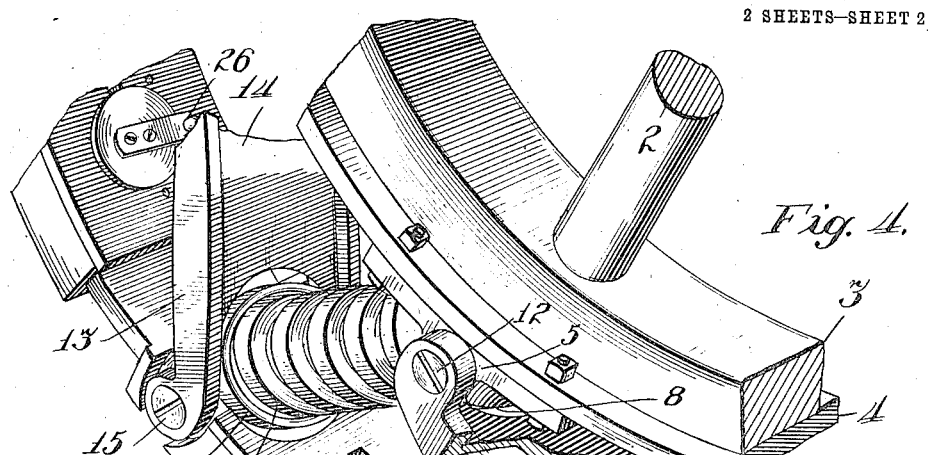
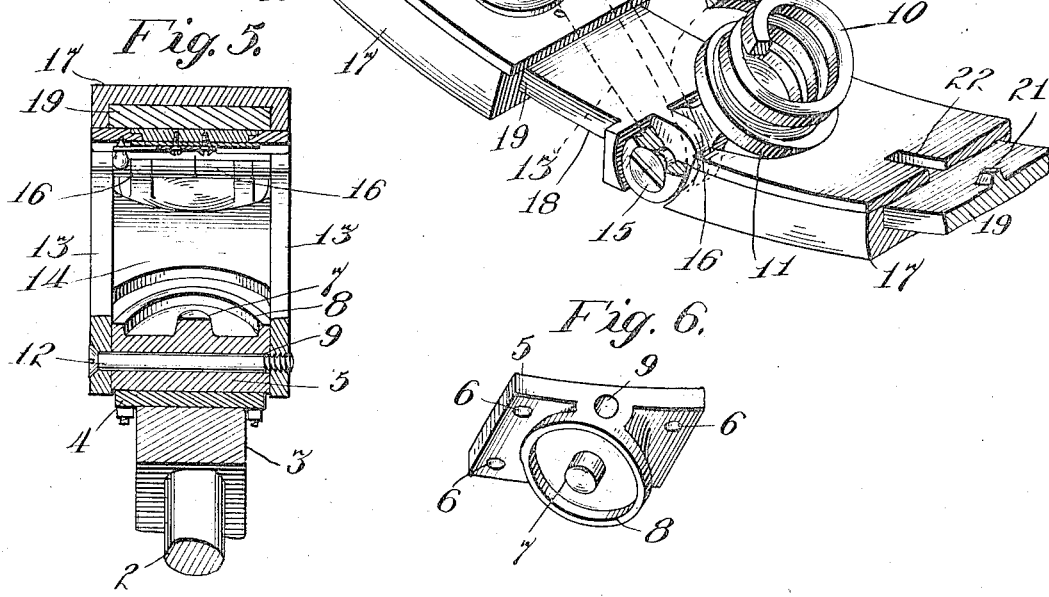
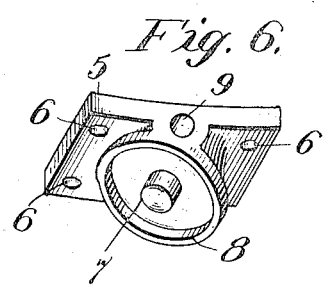
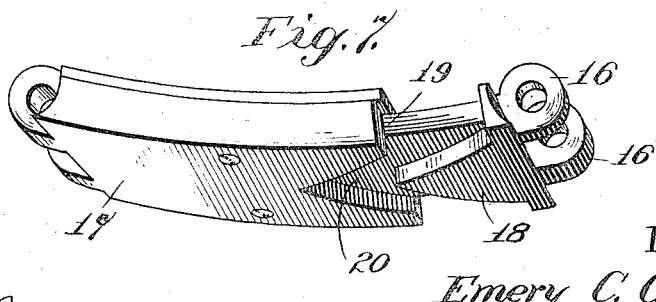
Witnesses:
Milton Lenoir
F. A. Flnell.
Inventor:
Emery C. Graves.
Wallace R. Lane
Attorney.

UNITED STATES PATENT OFFICE.

EMERY C. GRAVES, OF GENESEO, ILLINOIS.

VEHICLE-WHEEL.

1,068,582.                Specification of Letters Patent.      Patented July 29, 1913.

Application filed August 5, 1912. Serial No. 713,257.

*To all whom it may concern:*

Be it known that I, EMERY C. GRAVES, a citizen of the United States, residing at Geneseo, county of Henry, and State of Illinois, have invented new and useful Improvements in Vehicle-Wheels, of which the following is a specification.

It is the object of the present invention to provide a resilient wheel suited for use on motor trucks, automobiles, wagons and even lighter vehicles and free from many of the objectionable characteristics of pneumatic wheels.

More particularly, the invention comprises a metal rim built up in sections with sliding adjustment between the sections, this rim being spaced from the felly of the wheel by springs and links advantageously positioned to bring about the desired result. In a certain sense the outer ring or rim with its coöperating links and springs may be regarded as an attachment for wheels of standard construction, inasmuch as these elements can be applied to a standard wheel without radical changes therein, or may be detached from the felly to leave a complete, operative, solid wheel.

Other special objects and advantages of the present invention will become clear from the following detailed description, which is to be taken in conjunction with the accompanying drawings, wherein—

Figure 1 is a side elevation of a complete wheel showing some of the springs compressed as if carrying a load, Fig. 2 is a sectional detail of one of the sections out of which the outer rim is constructed, Fig. 3 is a detail of the adjustable stop used to limit the sliding movement of the two coöperating members shown in Fig. 2 as comprising parts of a rim section, Fig. 4 is a perspective view of a fragment of the complete wheel illustrating the grouping of springs and links, Fig. 5 is a section through the structure of Fig. 4 taken adjacent to the spoke, Fig. 6 is a perspective view of one of the inner spring sockets, and Fig. 7 illustrates the sliding relation between the two members of a rim section.

The embodiment illustrated in the drawings comprises a hub 1 with an appropriate number of spokes 2 which carry a wooden felly 3, all in accordance with usual practice, it being understood that the dimensions of the several parts will be proportionate to the loads they are to carry, and that the wheel as a whole can be used either on heavy or light vehicles, bicycles and the like. Preferably the wooden felly 3 is shod with a metal tire 4 just as in the case of an ordinary solid wheel. This tire together with the felly serve as an anchoring means for the other parts of the complete structure.

Rigidly bolted to the tire 4, in alinement with each spoke, is a spring socket 5 of the shape shown in Fig. 6. Each socket is preferably formed from cast metal with suitable bolt holes 6 and an inclined abutment having a central projection 7 and an outer rim 8, between which the end of a helically coiled compression spring may be seated. The casting has a transverse hole 9 for the reception of a pivot pin, as hereinafter explained. A coiled spring 10 is seated on each socket 5 and extends diagonally outward for seating in an outer socket 11 pivotally mounted to the outer rim of the wheel. These springs may be built up out of rectangular strips and are, of course, designed in strength, thickness and number of turns in accordance with the demands which the wheel must meet. Link members are pivotally connected at the base of each spring by means of a bolt 12 passed through the hole 9 (Fig. 6). These link members comprise side plates 13, preferably curved at their ends, as shown, to offset the pivotal points with respect to the axis of the link, thus allowing clearance for an inward swinging movement of the link when the springs are compressed in service. Rigidly connected between each pair of links 13, and preferably integral therewith, is a stiffening web 14 (Fig. 4) which holds the side members 13 against lateral movement and gives to the entire structure lateral stiffness and rigidity. The links 13 are inclined at such an angle with respect to the spoke, near which they are pivotally attached that they meet adjacent coiled springs at a pivotal point lying approximately in a line bisecting the angle between adjacent spokes, this feature of the present invention being of considerable importance in that it insures proper distribution of the strains on the wheel over several springs and equalizes the load in advantageous manner. The pivotal connection at the outer end of each link includes a transverse bolt 15 passing through both link members and through suitable ears on the adjacent spring socket 11, and also through ears 16 projecting from both ends of each outer tire section, as shown in Fig. 7.

Each of the sections which goes to make up the outer rim or tread of the wheel is of the type illustrated in Figs. 2 and 7 and comprises two members 17 and 18 shaped to slide one into the other whenever the yielding of a supporting spring demands inward movement of the outer rim. Member 17 is in the nature of a housing member having a recess for receiving the rectangular sliding tongue 19 of member 18, this housing member being notched at its outer face at 20 to receive the triangular projection of the opposing member 18 (Fig. 7). When the wheel rolls over obstructions, or is called upon to carry a heavy load, these members 17 and 18 will slide toward and from one another in accordance with the compression of the diagonally mounted springs which separate the outer rim from the felly of the wheel. As a means for governing the outward movement or expansion of the rim section, I have provided an upwardly projecting lug 21 (Fig. 2) which slides along a slot 22 in the upper face of member 17 and which strikes against a stop at the outer end of that slot after the expansion has taken place as far as is consistent with the demands to be placed on the wheel. To provide for adjustment in this expansion, thereby governing the normal tension on the coiled springs, the stop is of the shape illustrated in Fig. 3 and comprises three slots, 23, 24 and 25, either of which may be swung around through rotation of the stop by means of its handle 26 until there is alinement between the swinging slot and the main slot 21. Thus, for high normal tension on the coiled springs, slide 23 will be placed in alinement with slide 22 and the stop 21 will be held with the members 17 and 18 only partially separated, whereas, for light normal compression of the springs, the longer rotating slot 25 will be used, greater sliding movement will be permitted, and greater working diameter of the outer rim will be effected.

The wheel is well adapted for carrying its load when rolling either to the right or to the left, as viewed in Fig. 1. And in any case, the springs near the point of contact with the ground will be compressed with accompanying inward movement of the adjacent sections of the outer rim, this movement being a swinging motion controlled by the pivoted links and directed diagonally inward toward the end of a spoke. But the inward movement of any one section produced by contact with the ground is accompanied by an inward movement of adjacent sections and consequent compression of adjacent springs, this result being insured because of the swinging motion of the links whereby the outer rim is anchored. For instance, a substantial inward motion of the lowermost section (Fig. 1) may produce sympathetic motion in three or more of the connected sections at the left with resultant compression of their springs and inward swinging movement of their links. The transverse reinforcement 14 (Fig. 4) for the links protects the wheel against side whipping or instability, and holds the outer rim rigidly against lateral strain.

What I claim as new and desire to secure by Letters Patent of the United States is:

1. In a vehicle wheel having a hub, spokes, and a felly, the combination of an expansible metal rim, coiled springs positioned diagonally between said felly and said rim, and diagonal links pivotally mounted between said felly and said outer rim.

2. The combination with a wheel having a felly of an outer rim comprising sections pivoted to one another, each of said sections comprising members mounted to slide on one another, and diagonal springs positioned between said felly and said outer rim to hold said rim yieldingly in position.

3. In a vehicle wheel having a felly, the combination of an outer metal rim comprising a plurality of sections pivoted to one another, each of said sections comprising members mounted to slide on one another, a helical spring diagonally positioned between a pivotal connection of the outer rim and the felly, and a diagonal link member coöperating with each spring to hold the outer sections in working relation to said felly.

4. In a vehicle wheel, an outer metal rim composed of rigid sections pivotally mounted to one another, each section comprising a pair of members shaped to slide on one another, resilient means for expanding said outer rim, and adjusting means for governing the distance through which the members of a section may slide on one another.

5. In a vehicle wheel having spokes and a felly, the combination of an outer rim composed of pivotally connected sections a helical spring for each spoke positioned diagonally between said felly and said outer rim, and a holding link pivoted to said outer rim near the end of the helical spring and also pivotally connected with the felly in alinement with a spoke.

6. In a vehicle wheel having a hub, spokes and a felly, a metal tire for said felly, sockets bolted to said tire in alinement with said spokes, a helical spring seated in each of said sockets and extending diagonally outward, a link member pivoted to each socket and extending diagonally to meet the outer end of an adjacent spring, each of said link members having a reinforcing transverse web, and an outer rim formed of sections pivoted together, these pivotal connections including a pin which serves as a pivot for a link member, said sections each comprising a pair of members shaped to slide one into the other when the springs yield under a load.

7. In a vehicle wheel having a hub, spokes and a felly, the combination of an expansible metal rim, resilient means and links coöperating with said resilient means for supporting said rim from said felly, and means for adjusting said resilient means and links to suit the load to be carried by the wheel by regulating the length of said expansible rim.

8. In a vehicle wheel, an outer metal rim composed of sections, said rim being expansible, resilient supporting means and links coöperating with said resilient means for said rim tending to expand the same, and adjustable means for regulating the possible expansion of said rim to vary the resiliency of the wheel in accordance with the load to be carried.

9. In a vehicle wheel having spokes and a felly, the combination of an outer expansible rim composed of pivotally connected sections, a helical spring for each spoke positioned diagonally between said felly and the pivot point of a section of the outer rim and holding links pivoted to said outer rim at the points of connection of said helical springs, said holding links being reinforced by a transverse web, stiffening the links against side whipping.

10. In a vehicle wheel, an outer metal rim composed of sections, said rim being expansible, resilient supporting means for said rim tending to expand the same, the sections of said outer rim comprising a pair of parts adapted to slide over one another through a pre-determined distance, and adjusting means for regulating the distance through which said parts can slide, thereby controlling the possible expansion of the rim to vary the resiliency of the wheel.

11. In a vehicle wheel, an outer rim composed of sections, each comprising a pair of members mounted to slide over one another, one of said members having a tongue, a slot in the other of said members in which said tongue is adapted to slide, and adjusting means for regulating the distance in said slot through which said tongue may slide to control the possible expansion of said rim and thereby to control the normal tension of the resilient supporting means for the rim.

In witness whereof, I hereunto subscribe my name to this specification in the presence of two witnesses:

EMERY C. GRAVES.

Witnesses:
   JAMES S. BAUME,
   JAMES C. BAKER.